US010774887B2

(12) United States Patent
Allington et al.

(10) Patent No.: US 10,774,887 B2
(45) Date of Patent: Sep. 15, 2020

(54) LATCH ACTIVATION BETWEEN MEMBERS (71) Applicant: Eddy Current Limited Partnership, Wellington (NZ)

(72) Inventors: Christopher James Allington, Leeston (NZ); Andrew Karl Diehl, Wellington (NZ); Kevin A. Wright, Wellington (NZ); Weston Hill, Wellington (NZ); Dave Walters, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 229 days.

(21) Appl. No.: 15/532,468

(22) PCT Filed: Dec. 4, 2015

(86) PCT No.: PCT/NZ2015/050205
§ 371 (c)(1),
(2) Date: Jun. 1, 2017

(87) PCT Pub. No.: WO2016/089225
PCT Pub. Date: Jun. 9, 2016

(65) Prior Publication Data
US 2017/0328424 A1 Nov. 16, 2017

(30) Foreign Application Priority Data

Dec. 4, 2014 (NZ) ........................ 701545

(51) Int. Cl.
*F16D 59/00* (2006.01)
*H02K 49/04* (2006.01)
(Continued)

(52) U.S. Cl.
CPC ................ *F16D 59/00* (2013.01); *A62B 1/06* (2013.01); *A62B 1/08* (2013.01); *A62B 35/0093* (2013.01);
(Continued)

(58) Field of Classification Search
CPC ........ F16D 59/00; F16D 43/14; F16D 63/002; F16D 63/006; F16D 2023/123;
(Continued)

(56) References Cited

U.S. PATENT DOCUMENTS 2,058,024 A 10/1936 Logan, Jr.
2,122,312 A 6/1938 Cassion
(Continued)

FOREIGN PATENT DOCUMENTS

CN 1783674 A 6/2006
CN 101820952 A 9/2010
(Continued)

OTHER PUBLICATIONS

Extended European Search Report, dated Jul. 11, 2017, for European Application No. 14872681.3-1809, 10 pages.
(Continued)

Primary Examiner — David J Hlavka
(74) Attorney, Agent, or Firm — Seed Intellectual Property Law Group LLP (57) ABSTRACT Described herein is a system, method of use and Self Retracting Lifeline (SRL) apparatus using a system that governs a dynamic response between members causing a halt in relative motion between the members. Magnetic interactions, eddy current drag forces and centrifugal and/or inertial forces may provide various mechanisms of governing movement.

9 Claims, 9 Drawing Sheets (51) Int. Cl.
*F16D 63/00* (2006.01)
*A62B 35/00* (2006.01)
*A62B 1/08* (2006.01)
*H02K 49/10* (2006.01)
*F16D 43/14* (2006.01)
*A62B 1/06* (2006.01)
*F16D 125/36* (2012.01)
*F16D 127/00* (2012.01)
*F16D 129/06* (2012.01)
*F16D 23/12* (2006.01)

(52) U.S. Cl.
CPC ............ *F16D 43/14* (2013.01); *F16D 63/002* (2013.01); *F16D 63/006* (2013.01); *H02K 49/04* (2013.01); *H02K 49/106* (2013.01); *F16D 2023/123* (2013.01); *F16D 2043/145* (2013.01); *F16D 2125/36* (2013.01); *F16D 2127/002* (2013.01); *F16D 2129/065* (2013.01); *Y02B 10/30* (2013.01); *Y02E 10/725* (2013.01)

(58) Field of Classification Search
CPC ......... F16D 2043/145; F16D 2129/065; F16D 2127/002; F16D 2125/36; H02K 49/106; H02K 49/04; A62B 1/08; A62B 1/06; A62B 35/0093; Y02B 10/30; Y02E 10/725
See application file for complete search history.

(56) References Cited

U.S. PATENT DOCUMENTS

| | | |
|---|---|---|
| 2,122,315 A | 6/1938 | Fosty et al. |
| 2,272,509 A | 2/1942 | Cavallo |
| 2,409,009 A | 10/1946 | Bakke |
| 2,428,104 A | 9/1947 | Winther |
| 2,437,871 A | 3/1948 | Wood |
| 2,492,776 A | 12/1949 | Winther |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A | 1/1976 | Avitzur |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A | 2/1986 | Sugimoto |
| 4,612,469 A | 9/1986 | Muramatsu |
| 4,676,452 A | 6/1987 | Nakajima |
| 4,690,066 A | 9/1987 | Morishita et al. |
| 4,729,525 A | 3/1988 | Rumpf |
| 4,826,150 A | 5/1989 | Minoura |
| 4,846,313 A | 7/1989 | Sharp |
| 4,895,317 A | 1/1990 | Rumpf et al. |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A | 1/1992 | Morris et al. |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A | 12/1995 | Lamb |
| 5,483,849 A | 1/1996 | Orii et al. |
| 5,495,131 A | 2/1996 | Goldie et al. |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kröger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,014,026 B2 * | 3/2006 | Drussel ............... F16D 43/08 192/105 B |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 7,984,796 B2 | 7/2011 | Pribonic |
| 8,037,978 B1 | 10/2011 | Boren |
| 8,272,476 B2 | 9/2012 | Hartman et al. |
| 8,424,460 B2 | 4/2013 | Lerner et al. |
| 8,490,751 B2 | 7/2013 | Allington et al. |
| 8,511,434 B2 | 8/2013 | Blomberg |
| 8,556,234 B2 | 10/2013 | Hartman et al. |
| 8,567,561 B2 | 10/2013 | Strasser et al. |
| 8,601,951 B2 | 12/2013 | Lerner |
| 8,851,235 B2 | 10/2014 | Allington et al. |
| 9,016,435 B2 | 4/2015 | Allington et al. |
| 9,199,103 B2 | 12/2015 | Hetrich et al. |
| 9,242,128 B2 | 1/2016 | Macy |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 | 11/2003 | Perkins et al. |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |

(56) References Cited

U.S. PATENT DOCUMENTS

| | | | |
|---|---|---|---|
| 2007/0000741 | A1 | 1/2007 | Pribonic et al. |
| 2007/0001048 | A1 | 1/2007 | Wooster et al. |
| 2007/0135561 | A1 | 6/2007 | Rath et al. |
| 2007/0228202 | A1 | 10/2007 | Scharf et al. |
| 2007/0228713 | A1 | 10/2007 | Takemura |
| 2007/0256906 | A1 | 11/2007 | Jin et al. |
| 2008/0059028 | A1 | 3/2008 | Willerton |
| 2008/0074223 | A1 | 3/2008 | Pribonic |
| 2008/0087510 | A1 | 4/2008 | Pribonic |
| 2008/0105503 | A1 | 5/2008 | Pribonic |
| 2008/0106420 | A1 | 5/2008 | Rohlf |
| 2008/0135579 | A1 | 6/2008 | Bertram et al. |
| 2009/0026303 | A1 | 1/2009 | Schmitz et al. |
| 2009/0032785 | A1 | 2/2009 | Jones |
| 2009/0084883 | A1 | 4/2009 | Casebolt et al. |
| 2009/0114892 | A1 | 5/2009 | Lesko |
| 2009/0166459 | A1 | 7/2009 | Niitsuma et al. |
| 2009/0178887 | A1 | 7/2009 | Reeves et al. |
| 2009/0211846 | A1 | 8/2009 | Taylor |
| 2009/0319212 | A1 | 12/2009 | Cech et al. |
| 2010/0032255 | A1 | 2/2010 | Conti et al. |
| 2010/0065373 | A1 | 3/2010 | Stone et al. |
| 2010/0112224 | A1 | 5/2010 | Lott |
| 2010/0116922 | A1 | 5/2010 | Choate et al. |
| 2010/0211239 | A1 | 8/2010 | Christensen et al. |
| 2011/0084158 | A1 | 4/2011 | Meillet et al. |
| 2011/0114907 | A1 | 5/2011 | Hartman et al. |
| 2011/0147125 | A1* | 6/2011 | Blomberg ............ H02K 49/043 182/232 |
| 2011/0166744 | A1 | 7/2011 | Lu et al. |
| 2011/0174914 | A1 | 7/2011 | Yang |
| 2011/0175473 | A1 | 7/2011 | Kitabatake et al. |
| 2011/0240403 | A1 | 10/2011 | Meillet |
| 2011/0297778 | A1 | 12/2011 | Meillet et al. |
| 2012/0055740 | A1 | 3/2012 | Allington et al. |
| 2012/0118670 | A1 | 5/2012 | Olson et al. |
| 2012/0312540 | A1 | 12/2012 | Lefebvre |
| 2013/0048422 | A1 | 2/2013 | Hartman et al. |
| 2013/0087433 | A1 | 4/2013 | Sejourne |
| 2013/0118842 | A1 | 5/2013 | Lerner |
| 2013/0186721 | A1 | 7/2013 | Bogdanowicz et al. |
| 2014/0048639 | A1 | 2/2014 | Allington et al. |
| 2014/0110947 | A1 | 4/2014 | Mongeau |
| 2014/0224597 | A1 | 8/2014 | Takezawa et al. |
| 2014/0346909 | A1 | 11/2014 | Vogler et al. |
| 2014/0375158 | A1 | 12/2014 | Allington et al. |
| 2015/0196820 | A1 | 7/2015 | Allington et al. |
| 2015/0266454 | A1 | 9/2015 | McGowan |
| 2015/0352380 | A1 | 12/2015 | Huang et al. |
| 2016/0052401 | A1 | 2/2016 | McGowan et al. |
| 2016/0317936 | A1 | 11/2016 | Diehl et al. |
| 2016/0360738 | A1 | 12/2016 | Richardson |
| 2017/0237313 | A1 | 8/2017 | Diehl et al. |
| 2017/0244313 | A1 | 8/2017 | Diehl et al. |
| 2017/0274261 | A1 | 9/2017 | Allington et al. |
| 2017/0338728 | A1 | 11/2017 | Diehl et al. |
| 2018/0245658 | A1* | 8/2018 | Diehl ..................... E04H 9/02 |
| 2018/0264296 | A1 | 9/2018 | Diehl et al. |
| 2018/0269767 | A1 | 9/2018 | Diehl et al. |
| 2018/0269768 | A1 | 9/2018 | Diehl et al. |
| 2018/0269769 | A1 | 9/2018 | Allington et al. |
| 2018/0370484 | A1 | 12/2018 | Diehl et al. |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 103244577 A | 8/2013 |
| CN | 103326538 A | 9/2013 |
| DE | 93 00 966 U1 | 3/1993 |
| DE | 10 2005 032 694 A1 | 1/2007 |
| EP | 0 247 818 A2 | 12/1987 |
| EP | 0 460 494 A1 | 12/1991 |
| EP | 0 909 684 A2 | 4/1999 |
| EP | 1 094 240 A2 | 4/2001 |
| EP | 1 401 087 A1 | 3/2004 |
| EP | 1 432 101 A1 | 6/2004 |
| EP | 1 480 320 A1 | 11/2004 |
| EP | 1 564 868 A1 | 8/2005 |
| EP | 1 244 565 B1 | 7/2006 |
| GB | 721748 A | 1/1955 |
| GB | 908128 A | 10/1962 |
| GB | 2 340 461 A | 2/2000 |
| GB | 2 352 644 A | 2/2001 |
| GB | 2 352 645 A | 2/2001 |
| GB | 2 352 784 A | 2/2001 |
| GB | 2 357 563 A | 6/2001 |
| JP | 49-097163 U | 9/1974 |
| JP | S53-113528 U | 9/1978 |
| JP | 56-107092 | 8/1981 |
| JP | 58-25152 U | 2/1983 |
| JP | 60-259278 A | 12/1985 |
| JP | 63-64542 A | 3/1988 |
| JP | H05-72684 A | 3/1993 |
| JP | 5-296287 A | 11/1993 |
| JP | H05-84347 U | 11/1993 |
| JP | 8-252025 A | 10/1996 |
| JP | 10-98868 A | 4/1998 |
| JP | 10-140536 A | 5/1998 |
| JP | H10-178717 A | 6/1998 |
| JP | 10-304799 A | 11/1998 |
| JP | 11-119680 A | 4/1999 |
| JP | 11-189701 A | 7/1999 |
| JP | 11-315662 A | 11/1999 |
| JP | 2000-189530 A | 7/2000 |
| JP | 2000-316272 A | 11/2000 |
| JP | 2001-17041 A | 1/2001 |
| JP | 2005-353123 A | 12/2005 |
| JP | 2012-152316 A | 8/2012 |
| RU | 106 462 U1 | 7/2011 |
| WO | 96/16496 A1 | 6/1995 |
| WO | 96/17149 A1 | 6/1996 |
| WO | 98/47215 A1 | 10/1998 |
| WO | 01/38123 A1 | 5/2001 |
| WO | 03/055560 A1 | 7/2003 |
| WO | 2007/060053 A1 | 5/2007 |
| WO | 2008/139127 A1 | 11/2008 |
| WO | 2009/013497 A1 | 1/2009 |
| WO | 2009/047469 A1 | 4/2009 |
| WO | 2009/108040 A1 | 9/2009 |
| WO | 2009/127142 A1 | 10/2009 |
| WO | 2010/104405 A2 | 9/2010 |

OTHER PUBLICATIONS

Extended European Search Report, dated Mar. 29, 2018, for European Application No. 15834380.6-1201, 12 pages.
Extended European Search Report, dated Apr. 6, 2018, for European Application No. 15864540.8-1201, 26 pages.
International Search Report and Written Opinion, dated Apr. 1, 2016, for International Application No. PCT/NZ2015/050206, 9 pages.
International Search Report and Written Opinion, dated Feb. 13, 2009, for International Application No. PCT/US2008/087863, 15 pages.
International Search Report and Written Opinion, dated Feb. 23, 2011, for International Application No. PCT/NZ2010/000011, 10 pages.
International Search Report and Written Opinion, dated Feb. 24, 2016, for International Application No. PCT/NZ2015/050207, 10 pages.
International Search Report and Written Opinion, dated Jan. 29, 2016, for International Application No. PCT/NZ2015/050208, 11 pages.
International Search Report and Written Opinion, dated Mar. 11, 2015, for International Application No. PCT/NZ2014/000245, 8 pages.
International Search Report and Written Opinion, dated Mar. 18, 2016, for International Application No. PCT/NZ2015/050209, 14 pages.

(56) References Cited

OTHER PUBLICATIONS

International Search Report and Written Opinion, dated Mar. 29, 2016, for International Application No. PCT/NZ2015/050205, 10 pages.
International Search Report and Written Opinion, dated Nov. 11, 2015, for International Application No. PCT/NZ2015/050114, 10 pages.
International Search Report and Written Opinion, dated Nov. 18, 2015, for International Application No. PCT/NZ2015/050113, 9 pages.
International Search Report and Written Opinion, dated Oct. 26, 2015, for International Application No. PCT/NZ2015/050115, 10 pages.
MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.
North Safety Products Europe B.V., "Climbing Wall Descender: FP2/5**GDD," *Climbing Wall Descent Controllers Instruction Manual v3*, Aug. 18, 2008, 20 pages.
Trublue Auto Belays, Model TB150-12C Operator Manual, Jun. 20, 2013, 37 pages.
Final Office Action, dated Feb. 28, 2017, for U.S. Appl. No. 14/464,255, Allington et al., "Braking Mechanisms," 10 pages.
Notice of Allowance, dated Jul. 21, 2014, for U.S. Appl. No. 13/255,625, Allington et al., "Braking Mechanisms," 11 pages.
Office Action, dated Aug. 22, 2017, for U.S. Appl. No. 14/464,255, Allington et al., "Braking Mechanisms," 5 pages.
Office Action, dated Feb. 20, 2018, for U.S. Appl. No. 14/464,255, Allington et al., "Braking Mechanisms," 15 pages.
Office Action, dated Jan. 17, 2018, for U.S. Appl. No. 15/586,111, Allington et al., "Braking Mechanisms," 15 pages.
Office Action, dated Jan. 9, 2014, for U.S. Appl. No. 13/255,625, Allington et al., "Braking Mechanisms," 9 pages.
Office Action, dated Jul. 25, 2016, for U.S. Appl. No. 14/464,255, Allington et al., "Braking Mechanisms," 10 pages.
Park et al., "Torque analysis and measurements of a permanent magnet type Eddy current brake with a Halbach magnet array based on analytical magnetic field calculations," *Journal of Applied Physics 115* (17):17E707, 2014. (3 pages).

* cited by examiner

FIGURE 10 input
output

LATCH ACTIVATION BETWEEN MEMBERS

BACKGROUND

Technical Field

Described herein is a system, method of use and Self Retracting Lifeline (SRL) apparatus using the system to control relative speed between members.

Description of the Related Art

The applicant's co-pending and granted patents in the field of eddy current related devices include U.S. Pat. Nos. 8,851,235, 8,490,751, NZ619034, NZ627617, NZ627619, NZ627633, NZ627630 and other equivalents all incorporated herein by reference. NZ627617 in particular, describes a method of achieving a latch operation between elements the contents of which are incorporated herein by reference. While the devices described in NZ627617 may be useful, other methods of controlling relative movement and/or braking may also be achieved or at least provide the public with a choice.

Further aspects and advantages of the system, method of use and Self Retracting Lifeline (SRL) apparatus should become apparent from the ensuing description that is given by way of example only.

BRIEF SUMMARY

Described herein is a system, method of use and Self Retracting Lifeline (SRL) apparatus using the system that govern a dynamic response between members causing a halt in relative motion between the members. Magnetic interactions, eddy current drag forces and centrifugal and/or inertial forces may provide various mechanisms of governing movement.

In a first aspect, there is provided a system with at least two members in a kinematic relationship, the system comprising a means of coupling a first member to at least one further member and in doing so causing synchronized relative motion between the members, wherein coupling occurs in response to a prescribed system dynamic response, the dynamic response selected from at least one of:

(a) a particular velocity action of one or more of the members;

(b) a particular acceleration action of one or more of the elements;

(c) a particular jerk action of one or more of the elements.

In a second aspect, there is provided a method of governing relative movement between members by the steps of:

(a) selecting the system substantially as described herein;

(b) applying a motive force on the system causing movement of at least one member in the system;

(c) causing coupling between the members when the prescribed system dynamic response occurs.

In a third aspect, there is provided a Self Retracting Lifeline (SRL) incorporating the system substantially as described herein.

The system, method of use and SRL device described offer the advantage of providing alternative ways of achieving movement control or at least provide the public with a choice.

BRIEF DESCRIPTION OF THE SEVERAL VIEWS OF THE DRAWINGS

Further aspects of the system, method of use and SRL device will become apparent from the following description that is given by way of example only and with reference to the accompanying drawings in which.

DETAILED DESCRIPTION

As noted above, described herein is a system, method of use and Self Retracting Lifeline (SRL) apparatus using the system that govern a dynamic response between members causing a halt in relative motion between the members. Magnetic interactions, eddy current drag forces and centrifugal and/or inertial forces may provide various mechanisms of governing movement.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'jerk' or grammatical variations thereof refers to a change in acceleration, typically a rapid and sudden change in acceleration compared to normal operating parameters.

In a first aspect, there is provided a system with at least two members in a kinematic relationship, the system comprising a means of coupling a first member to at least one further member and in doing so causing synchronized relative motion between the members, wherein coupling occurs in response to a prescribed system dynamic response, the dynamic response selected from at least one of:

(a) a particular velocity action of one or more of the members;

(b) a particular acceleration action of one or more of the elements;

(c) a particular jerk action of one or more of the elements.

The inventors have in effect produced a system relating to coupling members together based on the system dynamic response. The aim is to bring the members into synchronized motion under predetermined conditions.

Coupling between the members may be achieved:
(a) mechanically;
(b) magnetically;
(c) a combination of mechanically and magnetically.

Coupling may occur passively and once coupled the members may be remain coupled or may be releasably coupled. Coupling may instead be achieved via an active means.

The synchronized motion may be a zero absolute velocity or halting effect. This effect for example may be useful where all motion needs to stop, for example in a fall safety apparatus.

Coupling may also be based on, or at least influenced by, eddy current induced drag. This is not essential in the inventors experience but may be useful to further tune the dynamic response characteristics.

In one specific embodiment, coupling between the members may be achieved via mechanical coupling between at least one pawl linked to the first member, the pawl having an oscillatory movement action, and at least one latch member on, or being, the at least one further member, coupling occurring at a speed threshold according to the prescribed system dynamic response.

A bias relationship may exist between the pawl and the latch member, the bias being achieved through use of at least one magnet arranged for attraction, repulsion, or alternating attraction and repulsion, of the pawl.

At least one magnetic element may be located on both the pawl and first member and when rotation of the pawl and first member occurs, a varying bias results and hence oscillatory pawl movement occurs. The pawl may be axially mounted on the first member and the pawl center of gravity may be off set from the pawl axis of rotation thereby further influencing the oscillation effect.

As may be appreciated, the degree of oscillation of the pawl may be varied depending for example on the relative rates of motion of the first member and pawl (or first member and at least one further member.

The pawl dynamic response may be further tuned by varying the inertia of the pawl. As noted above, the center of mass of the pawl may be off set from the pawl axis of rotation assuming the pawl is connected in this manner to the first member. A part or parts of the pawl may be weighted so as to tune the inertia of the pawl to movement thereby tuning the dynamic response of the system.

The system may act as follows:

(a) at a predetermined speed, coupling may occur when the pawl moves to a deployed position for a sufficient time period such that it couples with the latch member; and (b) at speeds below the predetermined speed, the pawl may not couple.

Coupling may be avoided by having the pawl skip over the latch member—that is the pawl may not be sufficiently deployed to interfere with the latch member. Skipping over may continue until the inertial effects of the pawl are overcome and the pawl deploys sufficiently far to couple with the latch member.

The system may further act so that:

(a) the pawl may remain coupled when the speed of motion is insufficient to overcome the inertial effects of the pawl; and (b) decoupling may occur when the speed of motion is sufficient to overcome the inertial effects of the pawl.

The degree of bias noted above causing oscillation may be configured to provide the desired dynamic response behavior of the pawl.

In an alternative specific embodiment, coupling between the members may be achieved by a mechanical cam system based on the reaction effects of inertial forces and/or applied drag forces according to the prescribed system dynamic response.

In the above system, the first and at least one further member may be aligned together and the cam feature may be located between the first and at least one further member. In effect, the system has at least two independent but moving members.

The at least one further member may be configured with either or both of inertial characteristics and/or retarding drag due to motion such that it is subject to a slowed motion with respect to the first member when a motive force is applied on the system.

Relative velocity between the first and at least one further member may provide a displacement between the members and may urge the members to separate due to the cam profile prescribed movement path. Separation refers to the members moving apart with respect to each other.

Movement of the at least one further member may cause coupling with a latch member on or about the first member, coupling at least one anchor on the at least one further member to the latch member.

As may be appreciated, coupling of the further member to the latch member also results in coupling indirectly between the first and further member.

Coupling may be achieved via:
(a) a geometric latching interface;
(b) attraction of magnetic poles; or
(c) a combination of a geometric latching interface and attraction of magnetic poles.

In a further specific embodiment, coupling may rely on magnetic forces between the members wherein the magnetic forces between the members are configured to achieve an attraction force between the members, the attraction force being sufficient to slow and halt relative motion between the members resulting in synchronized relative motion according to the prescribed system dynamic response.

The magnetic forces may be imposed by magnetic pole elements acting between the members. For the purposes of this specification, magnetic pole action is termed 'cogging'. The cogging system may be designed in consideration of the dynamic behavior of the connected system and any peripheral energy absorbing means such that the system achieves a stop and hold action under the intended conditions. The magnetic pole elements may be configured to be ineffective or inactive under predetermined conditions. Variation in magnetic pole action may for example be achieved by varying the separation distance between members or parts thereof containing the magnet or magnets thereby reducing the magnetic interaction forces.

The system above may be a continuously coupled system where an externally applied motive force results in initial movement of the members, but a slow and halt action takes effect immediately between the members provided the motive force is sufficient to induce the prescribed system dynamic response.

As may be appreciated, in the first aspect above and the specific embodiments described, the members may move in a substantially linear kinematic relationship. Alternatively, the members may move in a substantially rotational kinematic relationship. Both actions may be possible and appropriate depending on the device in which the system may be used. Examples given or used herein are described in the rotational embodiment. Linear equivalent embodiments will be obvious to someone skilled in the art.

In a yet further specific embodiment, the members may be in a substantially rotational kinematic relationship and coupling between the members may be achieved via a centrifugal based system designed so that, on application of a motive force of a predetermined magnitude, the members couple together according to the prescribed system dynamic response.

The centrifugal forces acting on the members may be influenced by use of at least one weight or weighted element or part thereof.

The first and at least one further member may be aligned together and the centrifugal feature or features may be located between the first and at least one further member.

Velocity of the members may urge a displacement of the centrifugal feature or features which in turn urges the members to separate due to the centrifugal force imposed on the at least one further member.

Movement of the at least one further member may cause coupling with a latch member on or about the first member, coupling at least one anchor of the at least one further member to the latch member. As may be appreciated, coupling of the further member to the latch member also results in coupling indirectly between the first and further member.

Coupling may be achieved via:
(a) a geometric latching interface;
(b) attraction of magnetic poles; or
(c) a combination of a geometric latching interface and attraction of magnetic poles.

As noted above, the dynamic response may be in one of three ways. In more detail, specific examples of how the three actions might take place may be as follows:
A velocity sensitive device may be configured using pawls that are activated by centripetal forces acting against the constraint of a biasing element;
An acceleration sensitive device may make use of the inertial behavior of a pawl causing rotation of the pawl about its pivot in response to acceleration of the pawl mounting plate;
A jerk sensitive device may be configured by making use of the non-linear shear force capacity that exists between a pair of magnetic poles.

As should be appreciated, the configuration may be varied and the above options should be seen as non-limiting examples only.

In a second aspect, there is provided a method of governing relative movement between members by the steps of:
(a) selecting the system substantially as described herein;
(b) applying a motive force on the system causing movement of at least one member in the system;
(c) causing coupling between the members when the prescribed system dynamic response occurs.

In a third aspect, there is provided a Self Retracting Lifeline (SRL) incorporating the system substantially as described herein.

As noted above, the devices described may be used in SRL devices. The ability to detect and activate a braking element is important for SRL apparatus.

Detection of a fall event is commonly triggered by a mechanism that responds to a change in state of the line. Mechanisms can potentially be triggered by the displacement, velocity, acceleration or jerk (rate of change of acceleration) of the line, or by a combination of these signals.

Existing SRLs commonly make use of velocity or acceleration mechanisms, typically using a ratchet and pawl arrangement to couple the spool to a brake. Either the ratchet plate or the pawl set can be attached to the rotating spool.

A linear configuration may comprise a means of sensing a change in acceleration (jerk) of a carrier (moving element). The carrier may be attached to a rider (braking element) of known mass with a given inertia. When a contact force is applied to the carrier the rider and carrier remain coupled and aligned. A change in the applied force to the carrier (jerk) causes the rider to slip relative to the carrier due to the inertial effects. The inertial effects may then be tracked through displacement between the rider and carrier. When the carrier acceleration changes, the relative displacement between the rider and carrier also changes.

The same principle may be used in a rotational sense. The rider may be free to rotate with the carrier. A change in angular acceleration applied to the carrier may be resolved as a relative angular displacement between the carrier and rider.

Besides SRL applications, the devices and methods may be used for a variety of other applications, non-limiting examples including speed control or load control of:
An autobelay device;
A rotor in a rotary turbine;
Exercise equipment e.g. rowing machines, epicyclic trainers, weight training equipment;
Roller-coasters and other amusement rides;
Elevator and escalator systems;
Evacuation descenders and fire escape devices;
Conveyer systems:
Rotary drives in factory production facilities;
Materials handling devices such as conveyer belts or a braking device in a chute;
Roadside safety systems e.g. the energy absorber may be connected in a system to provide crash attenuation though the dissipation of energy via the energy absorber;
Seat belts in vehicles;
Zip lines;
Braking mechanisms for trolleys and carriages;
Bumpstops in transport applications;
Bumpstops in crane applications;
Torque or force limiting devices in mechanical drive train;
Structural overload protection in wind turbines;

Load limiting and energy dissipation in structures, buildings and bridges.

The system, method of use and SRL device described above offer the advantage of providing alternative ways of achieving movement control beyond for example reliance on centrifugal and/or eddy current forces alone. In addition, the relationship between the parts and the rate at which movement control occurs may also be influenced using the embodiments described herein.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relate, such known equivalents are deemed to be incorporated herein as of individually set forth.

Where specific integers are mentioned herein which have known equivalents in the art to which this invention relates, such known equivalents are deemed to be incorporated herein as if individually set forth.

WORKING EXAMPLES

The above described system, method of use and examples of Self Retracting Lifeline (SRL) apparatus using the devices are now described by reference to specific examples.

Example 1

General examples are provided below of magnetic latching caused by movement of a braking element.

Figure 1:
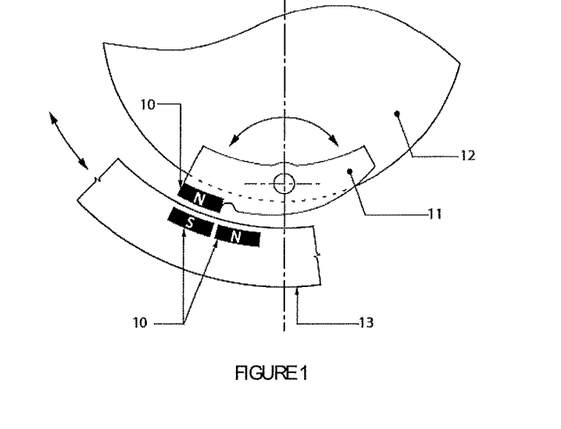
FIG. 1 illustrates a simplified elevation view of one embodiment of incorporating a magnetic interaction between a braking and moving element.

FIG. 1 illustrates an example of magnetic latching caused by movement of a pawl. Direct attractive forces exerted by permanent magnets 10 may be used to either augment or replace eddy current drag forces (if eddy current forces are used) as a means of activating a pawl 11 between the spool 12 (the first member) and a concentric external element 13 (the further member). When the pawl 11 is latched with the concentric external element 13, movement between the spool 12 and concentric external element 13 is synchronized.

Example 2

Figure 2:
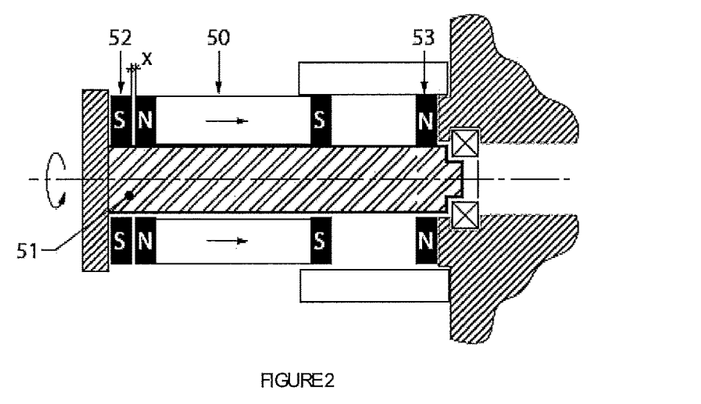
FIG. 2 illustrates a simplified elevation view of an alternative bi-stable embodiment.
Figure 3:
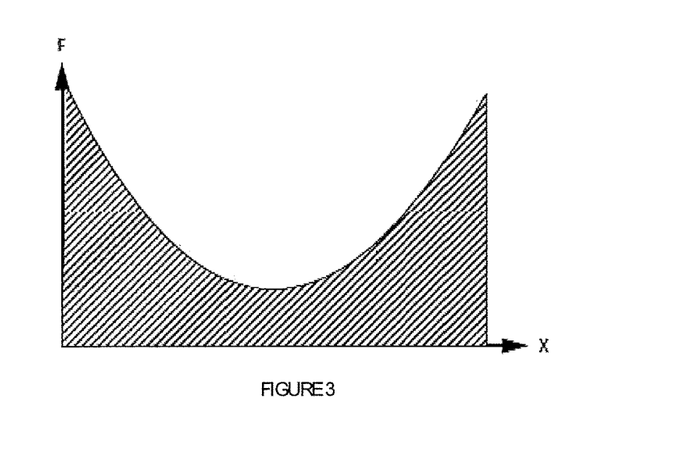
FIG. 3 illustrates a graph showing the magnetic force interaction for the above bi-stable embodiment.

A bi-stable arrangement can be used in conjunction with a tube and cylinder (plunger) approach described in the applicants co-pending application NZ619034. In this example, as illustrated in FIG. 2, a plunger 50 eddy current brake configuration is shown as a means of delaying the initial relative motion between the active brake element/plunger 50 and the lead screw 51 and/or to latch and lock the brake 50 at the end of the plunger axial travel stroke 52, 53. The output in terms of force/movement interaction is graphed in FIG. 3 showing how the force at either end of the plunger stroke 52, 53 is high and subsequently drops through the travel phase of the plunger stroke 52, 53 noting that the term force refers to the force required to translate the plunger sideways and movement is the lateral movement of the plunger.

Example 3

Figure 4:
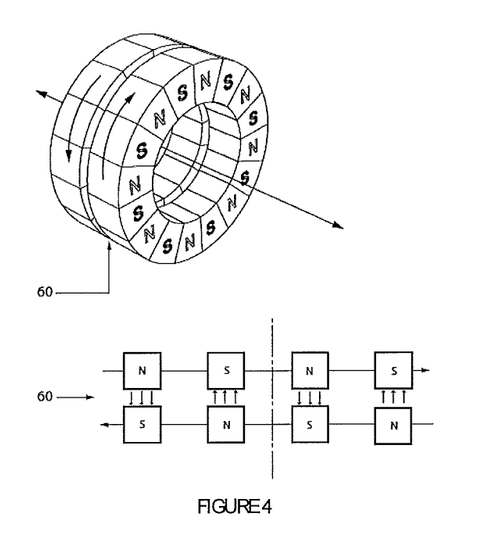
FIG. 4 illustrates a perspective view and elevation view of an alternative embodiment employing a cogging torque approach.
Figure 5:
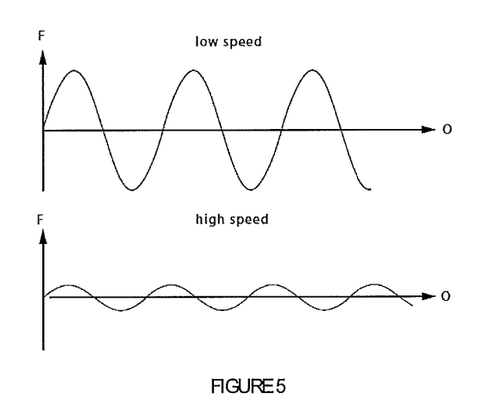
FIG. 5 illustrates two graphs showing the velocity dependent result from the cogging torque approach.

In a further embodiment, a cogging example is illustrated in FIG. 4. A cogging torque results from magnetic poles rotating with respect to each other generally indicated by arrow 60. This results in a speed-dependent torque relationship best seen in the graphs shown in FIG. 5 where F refers to the force/degree of oscillation and o refers to the movement path that can enable low-speed lock-off of a brake that relies on eddy current braking (the highest latching force occurs at low speed).

Figure 6:
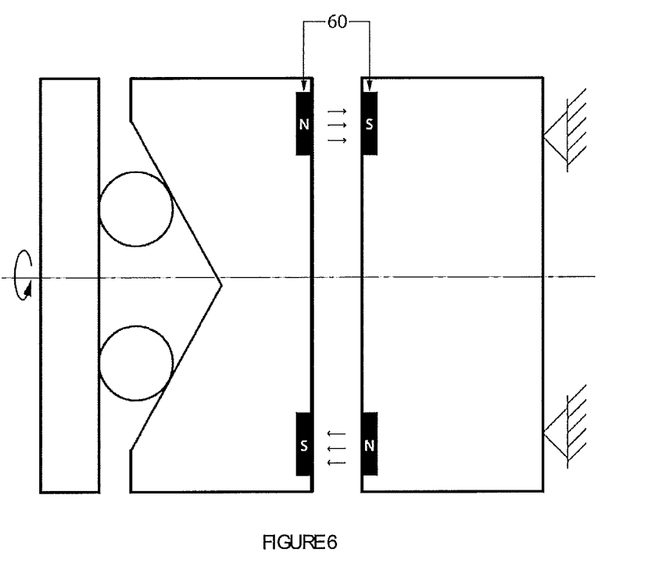
FIG. 6 illustrates a simplified elevation view of a cogging torque approach of a barking and moving element.

FIG. 6 shows how the magnets 60 align at low speed thereby halting further movement. This embodiment allows a complete halt in relative movement between the parts but without part interference or friction—that is braking is frictionless.

FIG. 6 also illustrates a centrifugal embodiment. One of the members includes weighted balls that move along a defined path. At maximum rotation force, the balls move to alter the center of gravity thereby changing the dynamic response of the system.

Example 4

Figure 7:
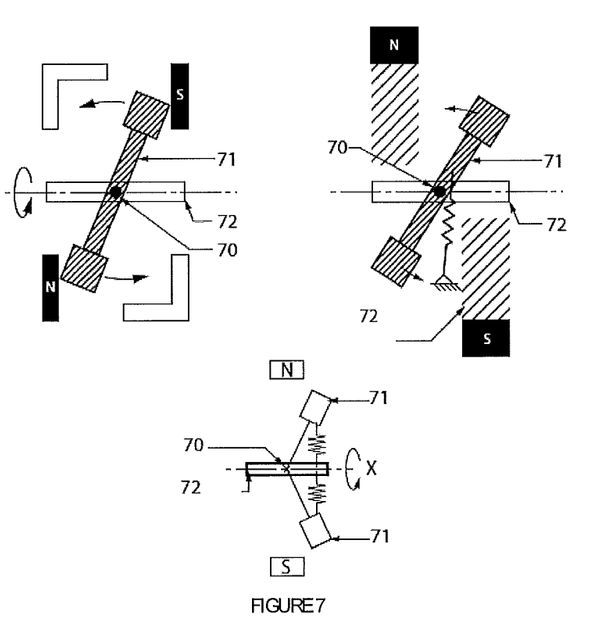
FIG. 7 illustrates a simplified elevation view of an alternative embodiment utilizing a rotational degree of freedom.
Figure 8:
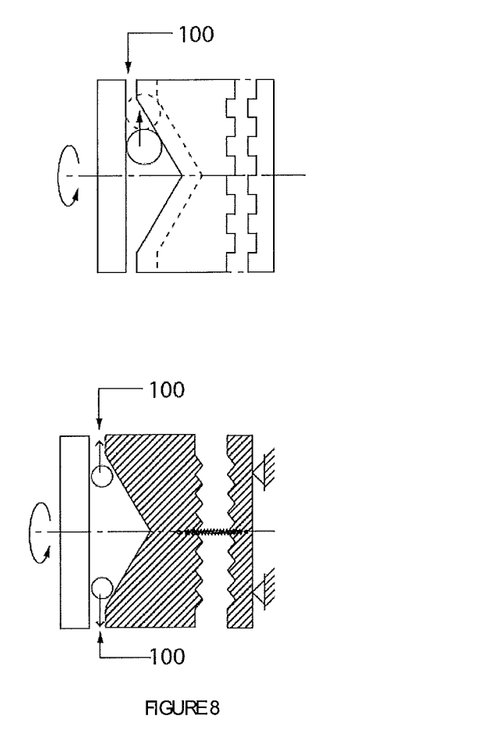
FIG. 8 illustrates elevation views of alternative cam path embodiments.
Figure 9:
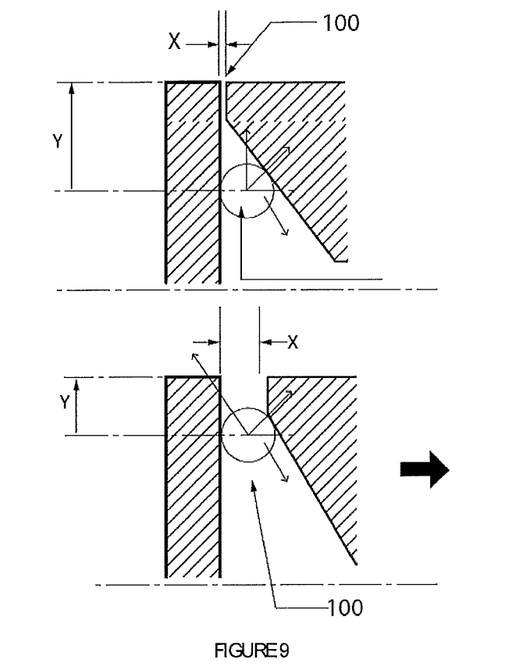
FIG. 9 illustrates elevation views of alternative cam path embodiments.
Figure 10:
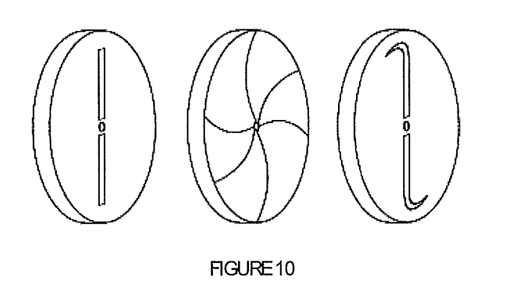
FIG. 10 illustrates perspective views of alternative cam path embodiments.
Figure 11:
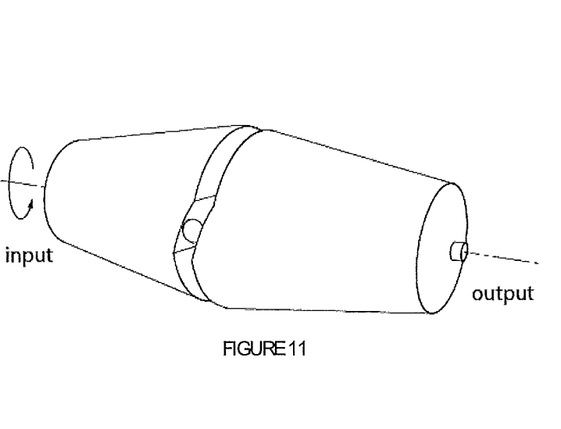
FIG. 11 illustrates a simplified perspective view of an alternative cam path embodiment.

Magnetic latching of a braking element can also be configured about a rotational degree of freedom normal to the primary drive axis, in this example being the rotation axis 70 of the braking element 71 relative to the moving element 72 (a rotor). FIG. 7 illustrates three embodiments of this type of system. Also shown in the FIG. 7 embodiments is the use of a bias (magnets and/or springs) that further tune the dynamic response of the system.

Example 5

Relative rotation between the moving and braking elements may also be further influenced by use of inertial or centrifugal forces resulting in differential velocity between the elements. In one embodiment, a differential velocity may be used to drive an axial displacement via a cam path 100 as illustrated in FIGS. 8 to 13. Different profiles can be used to control ball movement and thus alter the centrifugal force acting on the parts and their movement characteristics.

Figure 12:
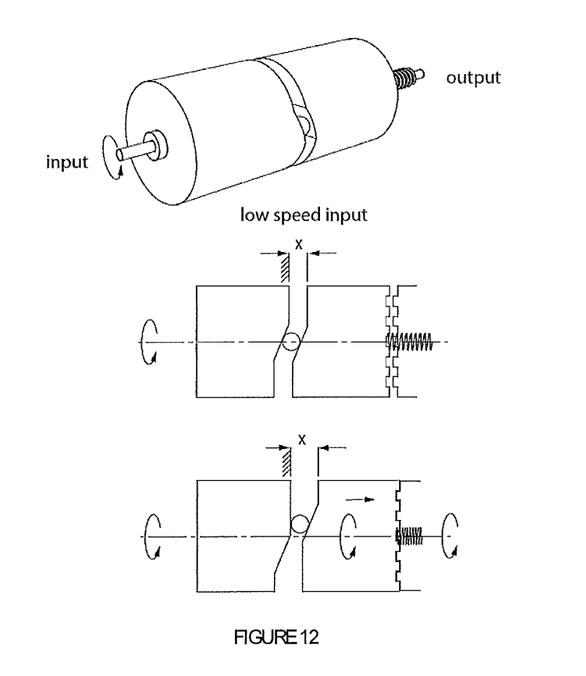
FIG. 12 illustrates simplified perspective and elevation views of an alternative cam path embodiment.
Figure 13:
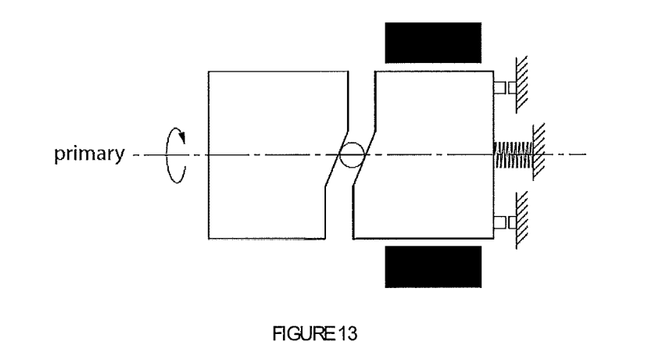
FIG. 13 illustrates a simplified elevation view of an alternative cam path embodiment.

The axial load required to maintain contact between the two halves in the embodiments shown in FIGS. 8 to 13 may be generated by a spring force, a magnetic repulsive force or as a result of eddy current drag torque acting through the cam 100 angle. Additional detail on this force generation is shown in FIGS. 12 and 13.

Example 6

Figure 14:
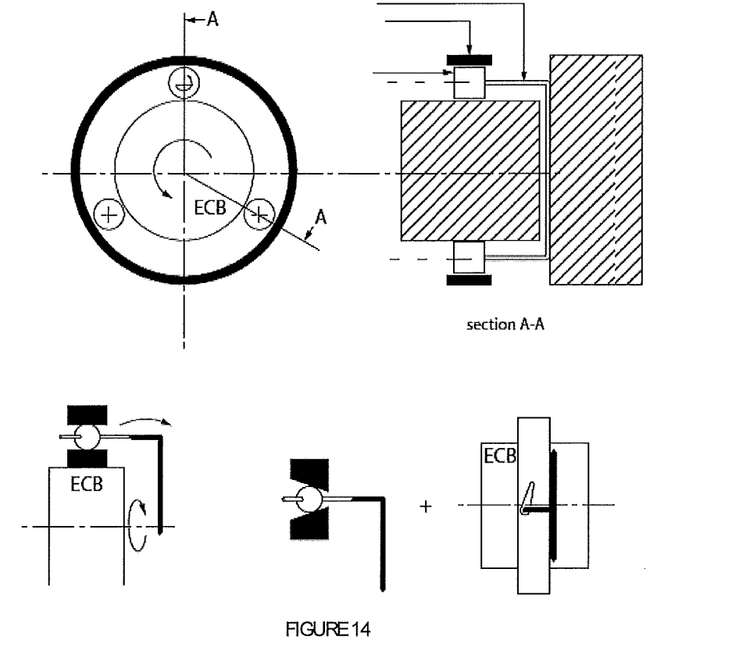
FIG. 14 illustrates various elevation views of an alternative embodiment using a combination of a cam, geometry, inertial response and eddy current.

Another arrangement that exploits the combination of cam geometry, inertial response and the eddy current drag force-speed relationship is shown in FIG. 14.

Example 7

As noted above, the ability to detect and activate a braking element is important for SRL apparatus.

Detection of a fall event is commonly triggered by a mechanism that responds to a change in state of the line. Mechanisms can potentially be triggered by the displacement, velocity, acceleration or jerk (rate of change of acceleration) of the line, or by a combination of these signals.

Existing SRLs commonly make use of velocity or acceleration mechanisms, typically using a ratchet and pawl arrangement to couple the spool to a brake. Either the ratchet plate or the pawl set can be attached to the rotating spool.

Figure 15:
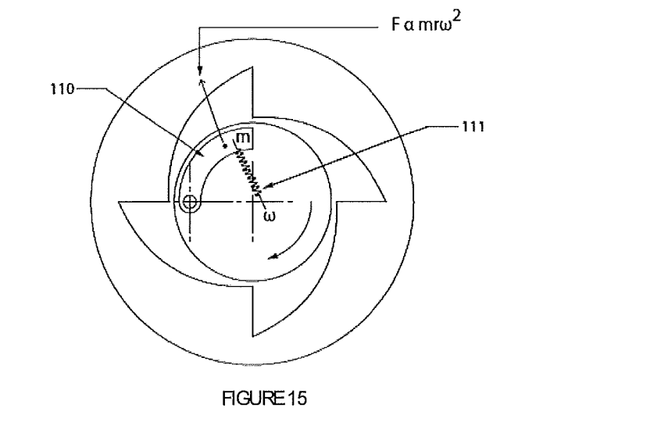
FIG. 15 illustrates a simplified elevation view of an art velocity sensitive device using pawls.

An art velocity sensitive device can be configured using pawls (braking elements) 110 that are activated by centripetal forces acting against the constraint of a biasing element (spring) 111 as illustrated in FIG. 15.

Figure 16:
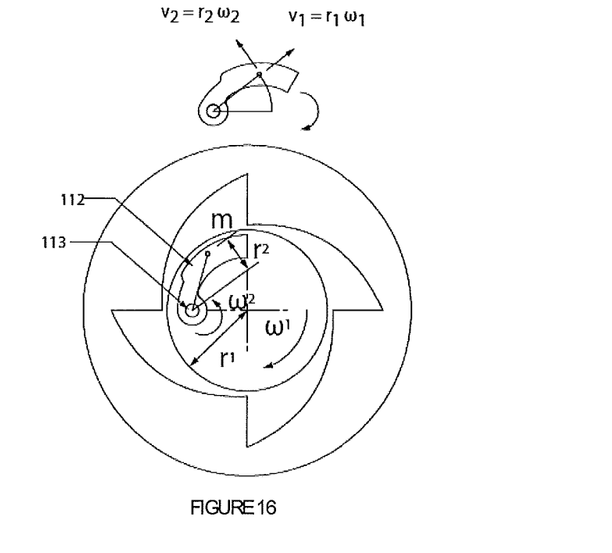
FIG. 16 illustrates a simplified elevation view of an art acceleration sensitive device using pawls.

An art acceleration sensitive device can make use of the inertial behavior of the pawl 112 causing rotation of the pawl 112 about its pivot 113 in response to acceleration of the pawl 112 mounting plate. This approach is illustrated in FIG. 16.

Example 8

A jerk sensitive device can be configured by making use of the non-linear shear force capacity that exists between a pair of magnetic poles.

Figure 17:
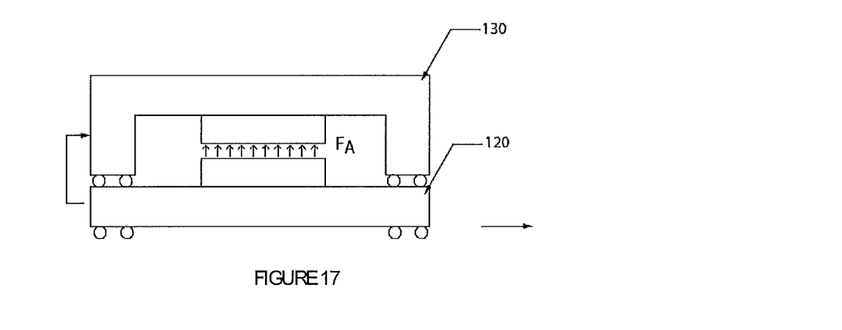
FIG. 17 illustrates a simplified elevation view of a jerk sensitive device.
Figure 18:
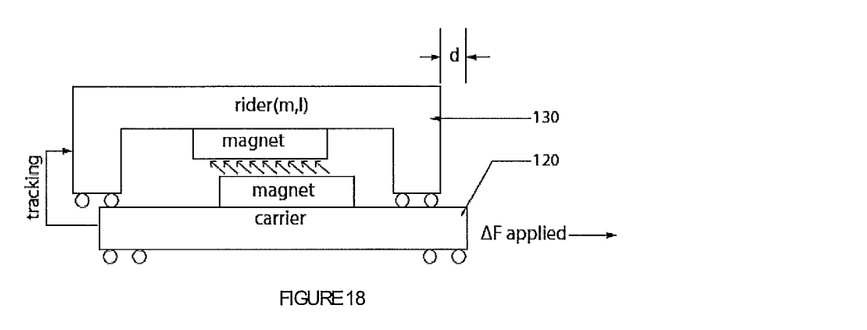
FIG. 18 illustrates a simplified elevation view of the jerk sensitive device of FIG. 17 in a varying alignment.
Figure 19:
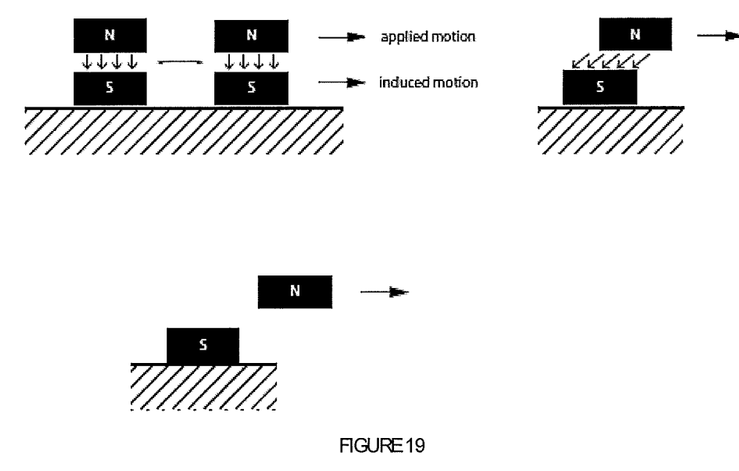
FIG. 19 illustrates a simplified elevation views of the magnetic interaction from the embodiment of FIGS. 17 and 18.
Figure 20:
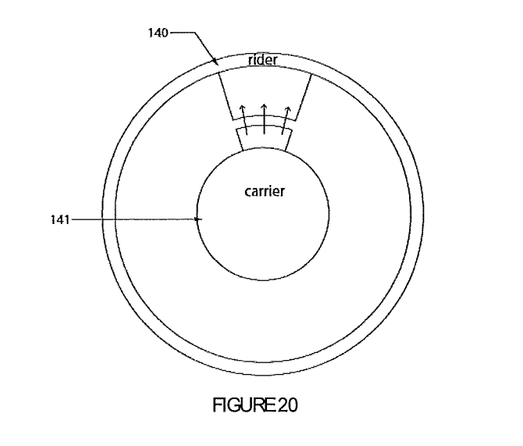
FIG. 20 illustrates a simplified elevation view of an alternative jerk sensitive device.

A linear configuration is illustrated in FIGS. 17 to 19. The configuration shows a means of sensing the change in acceleration (jerk) of a carrier. The carrier 120 is attached to a rider 130 of known mass with a given inertia. When a contact force is applied to the carrier 120 the rider 130 and carrier 120 remain coupled and aligned. A change in the applied force to the carrier 120 (jerk) causes the rider 130 to slip relative to the carrier 120 due to the inertial effects. The inertial effects may then be tracked through displacement 'd'. When the carrier 120 acceleration changes, the relative displacement between the rider 130 and carrier 120 changes.

Aspects of the system, method of use and Self Retracting Lifeline (SRL) apparatus using the system have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What we claim is:

1. A system comprising:
    a coupler configured to selectively couple a first member including a spool to at least one further member including an external member, and in doing so cause synchronized relative motion between the first member including the spool and the at least one further member including the external member;
    wherein the coupler includes a pawl linked to the spool;
    wherein the spool is rotatable within the external member and when the spool rotates within the external member below a speed threshold, the pawl oscillates relative to the spool and the coupler does not couple the first member including the spool to the at least one further member including the external member;
    wherein when the spool rotates within the external member above the speed threshold, the pawl of the coupler moves to a deployed position such that the pawl couples the first member including the spool to the at least one further member including the external member.

2. The system of claim 1 wherein the pawl experiences an alternating bias during rotation of the spool, the alternating bias causing the oscillation of the pawl.

3. The system of claim 2, further comprising a plurality of magnetic elements arranged to provide the alternating bias through alternating attraction and repulsion of the pawl.

4. The system of claim 3 wherein the bias acts between the pawl and the external member.

5. The system of claim 1 wherein the oscillation of the pawl is achieved magnetically and coupling of the first member including the spool to the at least one further member including the external member is achieved mechanically.

6. The system of claim 1 wherein coupling of the first member including the spool to the at least one further member including the external member is achieved both mechanically and magnetically.

7. The system of claim 1 wherein the synchronized relative motion is a zero absolute velocity or halting effect.

8. The system of claim 1 wherein coupling of the first member including the spool to the at least one further member including the external member is based on or influenced by an eddy current induced drag.

9. The system of claim 1 wherein coupling between the first member including the spool and the at least one further member including the external member is achieved via mechanical coupling between the pawl and at least one latch member on the external member.

* * * * *